(12) United States Patent
Fenley et al.

(10) Patent No.: US 10,870,239 B2
(45) Date of Patent: Dec. 22, 2020

(54) THREE-DIMENSIONAL PRINTING SYSTEMS AND METHODS

(71) Applicant: John Fenley, Provo, UT (US)

(72) Inventors: John Fenley, Provo, UT (US); Adrian Knotts, Bountiful, UT (US)

(73) Assignee: John Fenley, Provo, UT (US)

( * ) Notice: Subject to any disclaimer, the term of this patent is extended or adjusted under 35 U.S.C. 154(b) by 294 days.

(21) Appl. No.: 15/916,077

(22) Filed: Mar. 8, 2018

(65) Prior Publication Data

US 2018/0257307 A1 Sep. 13, 2018

Related U.S. Application Data

(60) Provisional application No. 62/468,931, filed on Mar. 8, 2017.

(51) Int. Cl.
| | |
|---|---|
| *B29C 64/393* | (2017.01) |
| *B28B 1/00* | (2006.01) |
| *B28B 17/00* | (2006.01) |
| *B33Y 50/02* | (2015.01) |
| *B29C 64/165* | (2017.01) |
| *B33Y 10/00* | (2015.01) |
| *B33Y 30/00* | (2015.01) |
| *B29C 64/112* | (2017.01) |
| *B29C 64/106* | (2017.01) |
| *B33Y 70/00* | (2020.01) |

(52) U.S. Cl.
CPC ............ *B29C 64/393* (2017.08); *B28B 1/001* (2013.01); *B28B 17/0081* (2013.01); *B29C 64/106* (2017.08); *B29C 64/112* (2017.08); *B29C 64/165* (2017.08); *B33Y 10/00* (2014.12); *B33Y 30/00* (2014.12); *B33Y 50/02* (2014.12); *B33Y 70/00* (2014.12)

(58) Field of Classification Search
CPC ... B29C 64/393; B29C 64/112; B29C 64/106; B29C 64/165; B33Y 10/00; B33Y 30/00; B33Y 70/00; B33Y 50/02; B28B 1/001; B28B 17/0081
See application file for complete search history.

(56) References Cited

U.S. PATENT DOCUMENTS 4,247,508 A * 1/1981 Housholder .......... B29C 39/025
264/219
5,669,712 A * 9/1997 Bauermeister ...... B01F 15/0279
222/145.1

(Continued)

*Primary Examiner* — Matthew J Daniels
*Assistant Examiner* — Gregory Chad Grosso
(74) *Attorney, Agent, or Firm* — Phillips Winchester; Justin K. Flanagan

(57) ABSTRACT

This disclosure provides various systems and methods for three-dimensional printing in which data describing an object as a plurality of voxels is transferred as a print material to form the three-dimensional object independent of locking. That is, various systems and methods are provided herein in which the three-dimensional printing step is to transfer data representing various voxels into a corresponding physical object via a three-dimensional printer. The first step is repeated until all of the voxels are printed without waiting for any of the voxels of print material to lock. Accordingly, the three-dimensional printer can be used to print at least one subsequent object while the first object finishes locking.

9 Claims, 15 Drawing Sheets

(56) References Cited

U.S. PATENT DOCUMENTS

2014/0252668 A1\* 9/2014 Austin .................. B29C 64/393
                                                         264/40.7
2018/0071948 A1\* 3/2018 Campbell .............. B33Y 30/00

\* cited by examiner

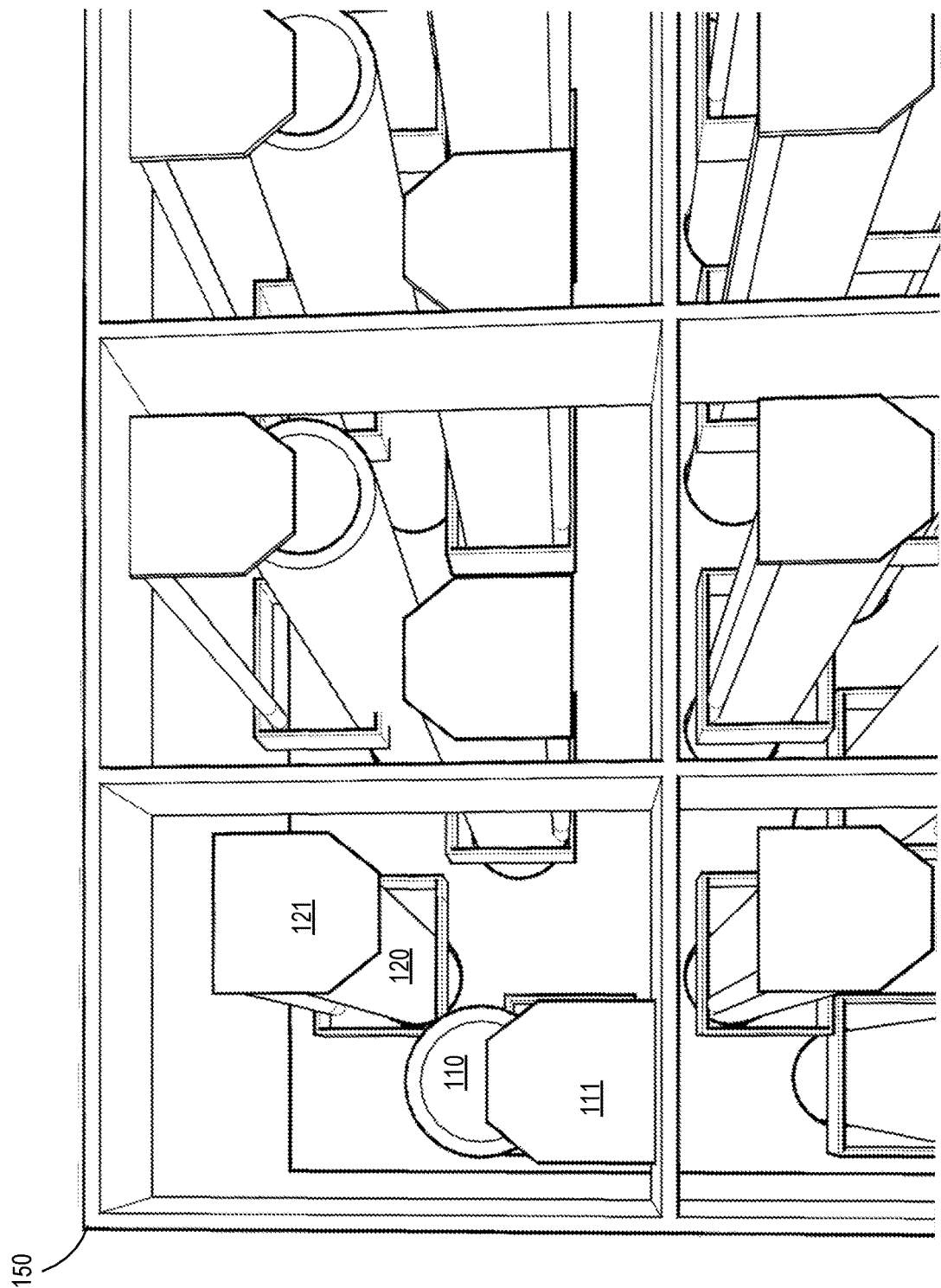

THREE-DIMENSIONAL PRINTING SYSTEMS AND METHODS

RELATED APPLICATIONS

This application claims priority under 35 U.S.C 119 to U.S. Patent Application No. 62/468,931 filed Mar. 8, 2017 titled "3-Dimensional Printing Systems and Methods," which is hereby incorporated by reference in its entirety, including the appendix thereto.

TECHNICAL FIELD

This disclosure generally relates to three-dimensional printing systems and methods. More specifically, this disclosure relates to three-dimensional printing systems in which printing successive layers is not limited by locking delays.

BRIEF DESCRIPTION OF THE DRAWINGS

Non-limiting and non-exhaustive embodiments of the disclosure are described herein, including various embodiments of the disclosure with reference to the figures listed below.

FIG. 1D illustrates a bottom view of the data transfer system in FIG. 1A with selectively openable tubes for extruding concrete and depositing fill material, according to one embodiment.

DETAILED DESCRIPTION

Figure 1A:
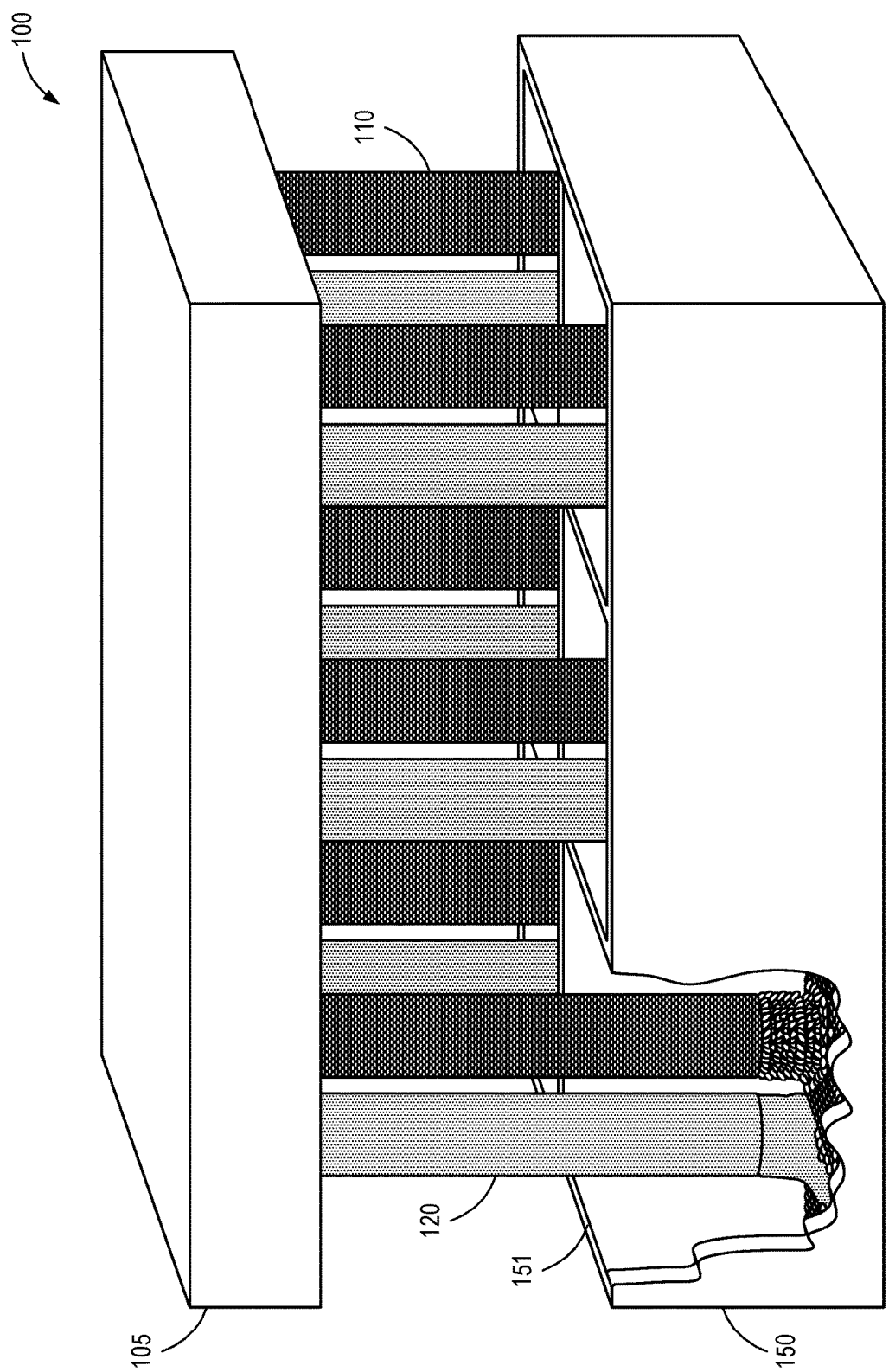
FIG. 1A illustrates a data transfer system for selectively printing voxels of concrete and depositing fill material, according to one embodiment.

Many three-dimensional printing systems and methods for three-dimensional printing utilize a multi-step process that includes printing a flowable material and waiting for that flowable material to "lock" before more flowable material is added to the existing flowable material. For example, a printing system may print with a print media such as polylactic acid (PLA), acrylonitrile butadiene styrene (ABS), acrylic, resin, etc. by printing a first, lowest layer and then, once the media has locked (e.g., hardened or cooled sufficiently to support a subsequent layer), printing a second layer. In many embodiments, a single print head is used and the mechanical movement is generally slow enough that by the time the printer begins printing the second layer, the first layer has already locked.

If, however, an object resembling a pencil were printed standing on its end, it is easily appreciated that the lower layers would need to sufficiently harden to support the top layers. A relatively fast printer may need to intentionally delay subsequent layers to ensure that the underlying layers have locked. Some three-dimensional printers have attempted to solve this problem by using cooling fluids or quick-locking material to decrease the lock time. As used herein, the term "locked" refers to any solidification process of a flowable material in three-dimensional printing. Examples of locking include, but are not limited to, cooling, hardening, drying, curing, phase-changing, undergoing a catalytic homopolymerization, undergoing a chemical reaction, and the like.

An example of a print material with a relatively long locking time is concrete. Current concrete three-dimensional printing may take multiple hours or days to print successive layers. Some approaches to decrease the locking time include quick-curing concrete, sprays to decrease locking time, and additives to decrease locking time. Even with these improvements, three-dimensional printing of large objects, such as structures (e.g., houses, buildings, sculptures, etc.), can take hours, days, or even weeks to complete. Many components of a concrete structure may require manual intervention using current approaches. For example, current processes for printing doorways, windows, overhangs, arches, etc. may require manual installation of concrete forms.

As described above, many existing systems and methods explicitly (or implicitly by the inherently slow printing system) follow a process in which a first step is to transform data for a first layer of a three-dimensional object into a physical object via a three-dimensional printer. The second step is to wait for previous layer to lock before beginning the second layer. In some systems, the second step is inherently introduced based on the (slow) speed of the system. In other systems, the second step may be explicitly introduced based on an expected or average locking time of the material being printed. Those two steps are repeated multiple times until each layer or voxel of the three-dimensional object is printed. In such embodiments, the three-dimensional printer is in use for the cumulative time it takes to print each of the layers and for all of the layers to lock.

This disclosure provides various systems and methods for three-dimensional printing in which data describing an object as a plurality of voxels is transferred to a three-dimensional object independent of locking. That is, various systems and methods are provided herein in which a first step is to transfer data representing various voxels into a corresponding physical object via a three-dimensional printer. The first step is repeated until all of the voxels are printed. The three-dimensional printer is then done and can be used to print a second object or another, different object. The second, locking step occurs independent of the three-dimensional printer and does not delay the transfer of data into a physical object.

As an example, a single three-dimensional printer may serially print multiple objects. The last of the multiple objects may be printed before the first of the objects is fully locked. In such an embodiment, all of the multiple objects may lock in parallel. This may be especially beneficial when printing with materials that take a long time to lock. As used herein, a "layer" may represent, for example, a planar layer that is one "voxel" thick. A voxel may correspond to the smallest feature size achievable by a particular three-dimensional printer. In some embodiments, the transfer of data representing an object to an actual object may include a conversion of the data to a plurality of voxels having dimensions corresponding to the resolution or minimum feature size of a particular printing device or print media.

The specific systems and methods described below effectively separate printing or data transfer stage from the locking stage. Printing speeds, or at least overall throughput of printing multiple objects, can be greatly increased by eliminating the need to wait for each subsequent object to be fully locked. With the locking step removed from the three-dimensional printing process, the number of printheads or nozzles can be increased to further reduce the total print time.

A first stage of three-dimensional printing can be characterized as data transfer. Data representing a physical, three-dimensional shape is transferred into a physical three-dimensional object via a three-dimensional printer. The data is effectively encoded in one or more materials as a printed volume. In some examples, the printed volume may be extruded, printed layer by layer, printed voxel by voxel, or otherwise transferred into a three-dimensional volume. In some embodiments, the printing process may include adding a material to an existing material, hardening or curing specific voxels of an existing material, or displacing one material with another material. In some embodiments, voxels of one or more types of materials may be added to a volume within a vacuum (e.g., within a vacuum chamber or in space).

In some embodiments, support material may reduce or eliminate post-print deformation until the material is fully locked. In some embodiments, predictable deformation is used as part of the printing process. As an example, an array (two-dimensional or three-dimensional) of print nozzles (more generally, "printheads") may inject a print material into a volume containing support material. The nozzles may, for example, be retracted from a bottom level of the support material up and out of the support material. As the nozzles are withdrawn, print material is injected into the support material to displace the support material at specific voxel locations. The support material substantially prevents the print material from deforming as it locks. The nozzles may be inserted within another volume of support material for a subsequent print operation while the first printed object is locking.

As a specific example, the support material may comprise a resin within a container. The two- or three-dimensional array of injector printheads may inject a resin hardener at specific locations within the container of resin as the array of injector printheads is withdrawn from the container. The entire printing process or "data transfer" may be completed within a few seconds in many embodiments. That is, all of the voxels of resin hardener may be deposited within the container of resin within a few seconds. The locking process may include the resin and resin hardener reacting to form hardened resin in, or approximately within, the voxel locations at which the injector printheads injected the resin hardener. In some embodiments, the locking process may take several minutes or even hours. However, the multi-dimensional array of injector printheads may be inserted within another container of resin for data transfer of another three-dimensional object while the first object is locking.

Conventional three-dimensional printing may follow a pattern of: (i) print first layer, (ii) lock first layer, (iii) print second layer, (iv) lock second layer, (v) print third layer . . . , etc. In an embodiment in which it takes 5 seconds to print a layer and 15 minutes for the layer to lock, the conventional approach could print two objects with 20 layers in about 10 hours. In contrast, the multi-dimensional array of injector printheads that allows for parallel locking could print 180 objects within the 10 hours and have another 180 that are in various stages of locking.

In other embodiments, as further described below, a print material (e.g., concrete) may be extruded into a space and a fill material (e.g., beads or gravel) may be selectively deposited to provide support for the print material. In such an embodiment, a finished print may include a contained volume of voxels occupied by either print material or fill material. Once the print material fully locks, the boundaries of the volume may be released and the fill material may be removed to reveal the fully locked print material.

In another embodiment, a supercooled liquid may remain dormant until nucleation points are created through focused ultrasound. Each nucleation point may represent a voxel of the final printed object. In another embodiment, pellets of a plastic may have a solvent sprayed on them at specific places as they flow into a container. In another embodiment, powdered metals may be bound with flux and soldered. In another embodiment, sand may be melted with beamformed radiation at various locations within a container.

Data transfer to a physical object can occur in a wide variety of other manners. Additional examples include forming shape crystals by injecting chemicals, aiming electron or proton beams, focusing ultrasound, firing high velocity seed crystals into place, laser heating, etc. In each of these embodiments, shape data is transferred into a physical object very quickly, but the material changes that take place (the locking) may occur over a longer time period.

As previously described, the locking stage may take some amount of time that is significantly greater than the printing stage. Three-dimensional printing speeds are greatly increased by constructing the printing system in such a way as to allow for a printing method that separates the print and locking stages. Each of the various embodiments described herein are merely examples of possible systems that allow for printing processes that are locking independent.

Some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like.

The processor may include a special-purpose processing device, such as an ASIC, a PAL, a PLA, a PLD, a CPLD, a Field Programmable Gate Array (FPGA), or other customized or programmable device. The computer may also include a computer-readable storage device, such as non-volatile memory, static RAM, dynamic RAM, ROM, CD-ROM, disk, tape, magnetic memory, optical memory, flash memory, or other computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable (SFP) transceivers, routers, hubs, switches, and/or other networking equipment.

The network may include communications or networking software, such as software available from Novell, Microsoft, Artisoft, and other vendors, and may operate using TCP/IP, SPX, IPX, SONET, and other protocols over twisted pair, coaxial, or optical fiber cables, telephone lines, satellites, microwave relays, modulated AC power lines, physical media transfer, wireless radio links, and/or other data transmission "wires." The network may encompass smaller networks and/or be connectable to other networks through a gateway or similar mechanism.

Aspects of certain embodiments described herein may be implemented as software modules or components. As used herein, a software module or component may include any type of computer instruction or computer-executable code located within or on a computer-readable storage medium, such as a non-transitory computer-readable medium. A software module may, for instance, comprise one or more physical or logical blocks of computer instructions, which may be organized as a routine, program, object, component, data structure, etc., that perform one or more tasks or implement particular data types, algorithms, and/or methods.

A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

Some of the embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Further, those of skill in the art will recognize that one or more of the specific details may be omitted, or other methods, components, or materials may be used. In some cases, operations are not shown or described in detail. Thus, the following detailed description of the embodiments of the systems and methods of the disclosure is not intended to limit the scope of the disclosure, as claimed, but is merely representative of possible embodiments.

FIG. 1A illustrates a data transfer system 100 for selectively printing voxels of concrete and depositing fill material, according to one embodiment. The illustrated data transfer system, or three-dimensional printer, 100 includes a control and supply component 105. The control and supply component 105 may control the extrusion and deposition of print material and fill material via concrete extrusion tubes 120 (shown with light shading) and fill material deposition tubes 110 (shown with dark shading).

Concrete may be selectively extruded via the concrete extrusion tubes 120 within divided sections or cells of a concrete printing printhead (e.g., cut-away section 151). Fill material, such as beads, plastic pellets, gravel, etc. may selectively deposited within the cells of the printhead within a container (155 in FIG. 1B) via fill material deposition tubes 110. In various embodiments, the data transfer system 100 transfers data representing a three-dimensional shape into concrete voxels. During deposition of the fill material and/or extrusion of the concrete, the cells (e.g., 151) of the printhead 150 may support the voxel formation of each material within a container. Subsequently, the container (155 in FIG. 1B) supports the outer perimeter of the concrete while it locks (i.e., cures). With a related function, the fill material holds the concrete in the correct voxel location within the container while the concrete locks.

Figure 1B:
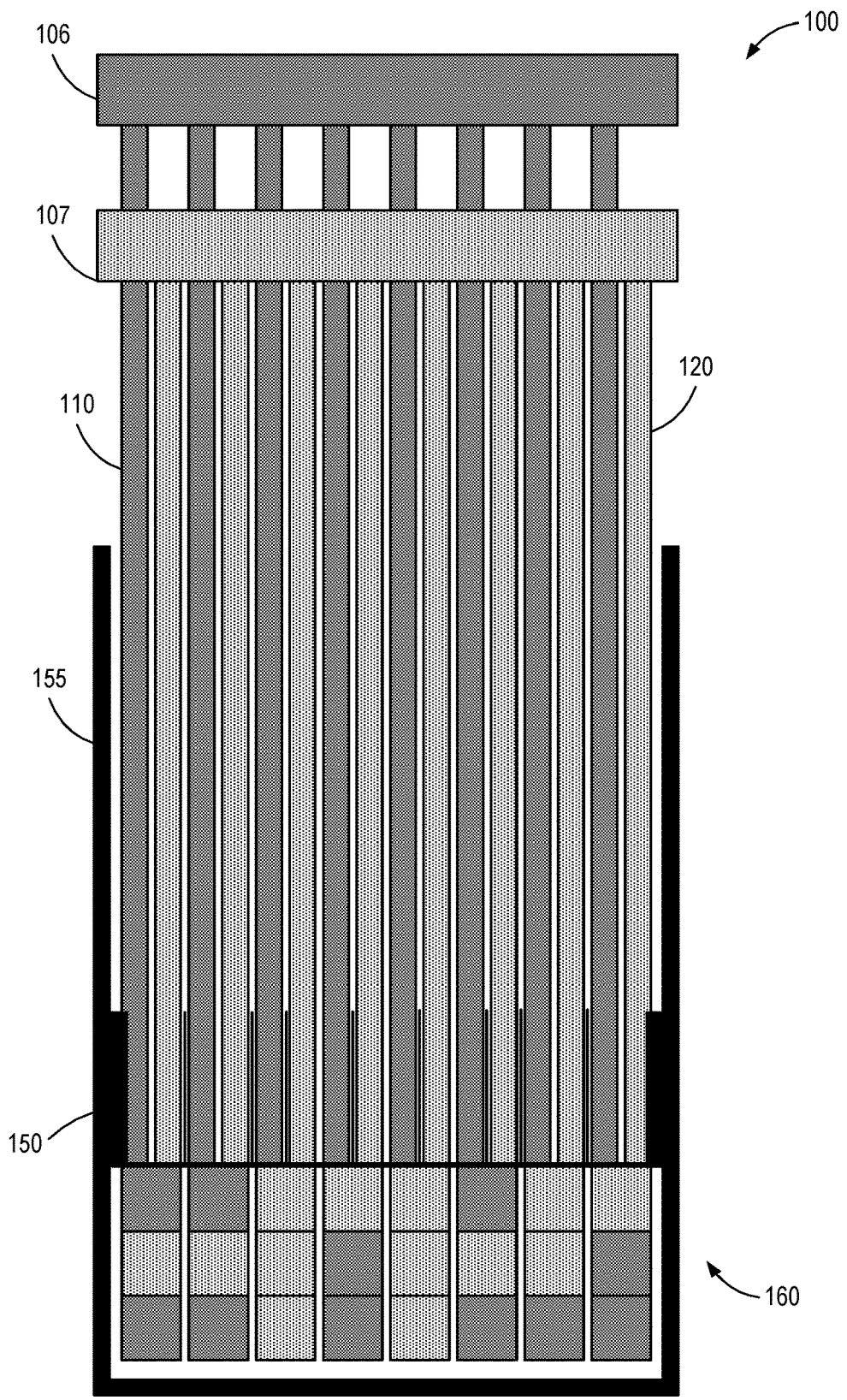
FIG. 1B illustrates a cross section of the data transfer system of FIG. 1A in which voxels of fill material have been deposited and voxels of concrete have been extruded.

FIG. 1B illustrates a cross section of the data transfer system 100 of FIG. 1A in which voxels 160 of fill material have been deposited and voxels 160 of concrete have been extruded. The voxels 160 of fill material are shown in dark shading and the voxels 160 of concrete are shown in light shading. A supply component and control system of the data transfer system 100 is divided into a concrete supply portion 107 and a fill material supply portion 106. As the supply portions 106 and 107 are extracted upward out of the container 155 along with a printhead 150 that may or may not include cells 151 as shown in FIG. 1A. Each voxel 160 is ultimately filled with either concrete or a fill material. A controller selectively opens and closes the fill material deposition tubes 110 and the concrete extrusion tubes 120.

Figure 1C:
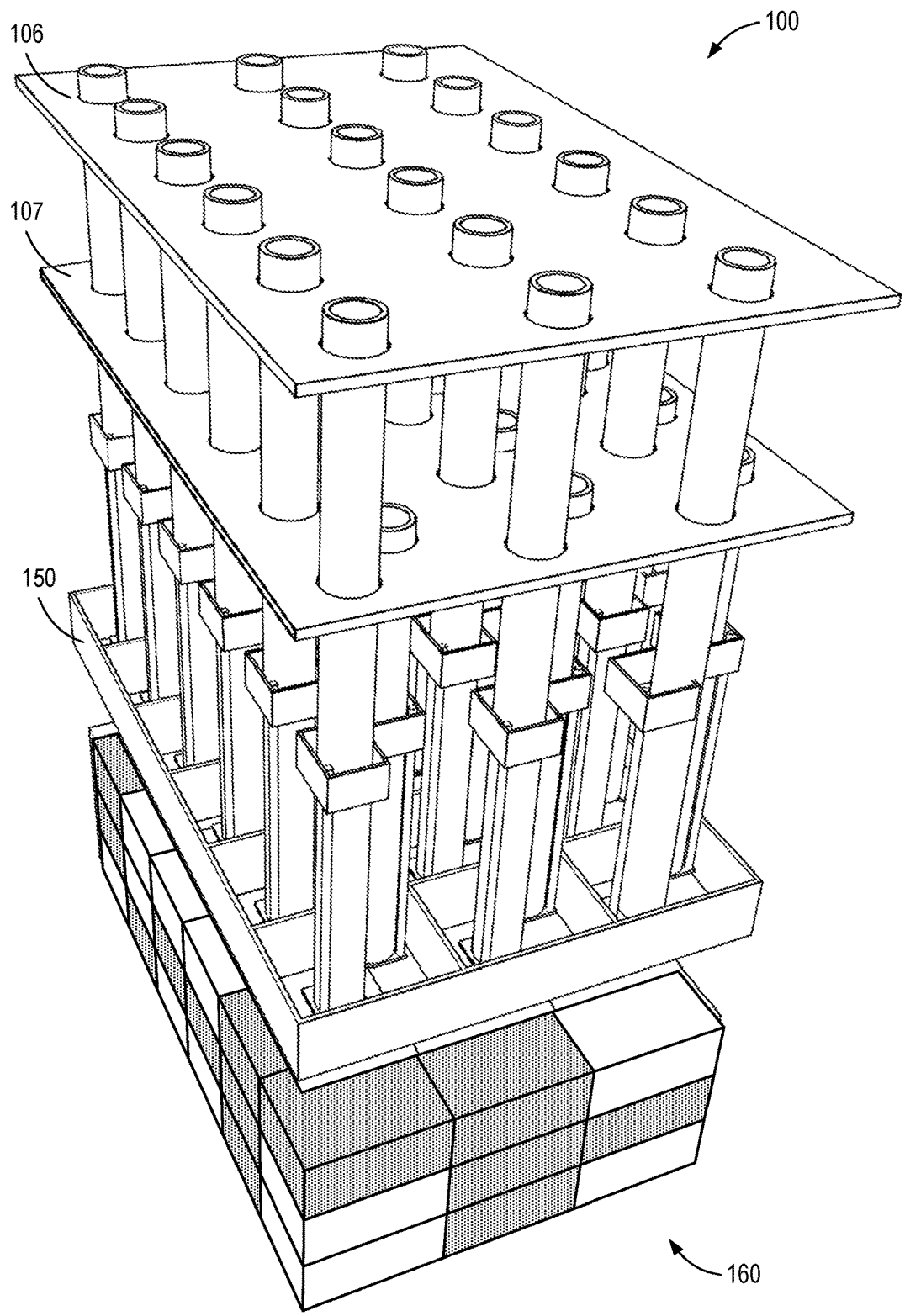
FIG. 1C illustrates a perspective view of the data transfer system of FIG. 1A for extruding concrete and depositing fill material in a three-dimensional array of voxels, according to one embodiment.

FIG. 1C illustrates a perspective view of the data transfer system 100 of FIG. 1A for extruding concrete from the concrete supply area 107 and depositing fill material in from the fill material supply area 106. A three-dimensional array of voxels 160 are shown with deposited voxels of fill material and concrete in dark and light shading, respectively. While the concrete is locking, a container (not shown) may contain the three-dimensional array of voxels 160. As the printhead 150 having multiple cells is retracted out of the container, additional voxels may be filled with fill material and/or concrete to ultimately form a target three-dimensional concrete object or shape.

While the illustrated embodiments contemplate a substantially rectangular container, in other embodiments, the container may be any shape and/or may outline a shape (i.e., have a hollow or unprinted center section). For example, the container may approximate a perimeter of a structure having a perimeter thickness corresponding to the thickness of the walls of the structure. Similarly, the examples provided herein show an array of eighteen (18) fill material deposition tubes 110 and eighteen (18) concrete extrusion tubes 120 for printing a three-dimensional array of voxels 160 having a length of six voxels, a width of three voxels, and a height of N voxels, where N corresponds to the number of voxels printed as the data transfer system 100 is retracted upward.

In other embodiments, each cell of a printhead may include more than one concrete extrusion tube 120 and/or more than one fill material deposition tube 110. In some embodiments, the printhead may be excluded altogether and/or the internal cell walls may be excluded. In such embodiments, the voxels may be form with slightly less defined perimeters if concrete and/or fill material that is extruded or deposited in one voxel is allowed to flow or spill slightly into a neighboring voxel. Depending on the resolution of the voxels as a whole and the target exactness of the printed object or shape, such an result may not impact the overall result.

FIG. 1D illustrates a bottom view of the data transfer system in FIG. 1A with selectively openable tubes 110 and 120 for depositing fill material and extruding concrete, respectively, according to one embodiment. In the illustrated embodiment, a controller selectively opens the tubes 110 and 120 by moving the tube covers 111 and 121, respectively. In the illustrated embodiment, each cell of the printhead 150 includes one tube 110 for selectively depositing fill material and one tube 120 for selectively extruding concrete. In some embodiments, tube covers 111 and 121 may be combined as a single unit that has two positions—a first position in which concrete is extruded and a second position in which fill material is deposited. In yet another embodiment, a single valve control unit can be selectively positioned in three positions—a first position in which concrete is extruded, a second position in which fill material is deposited, and a third position in which both tubes are closed.

Figure 2A:
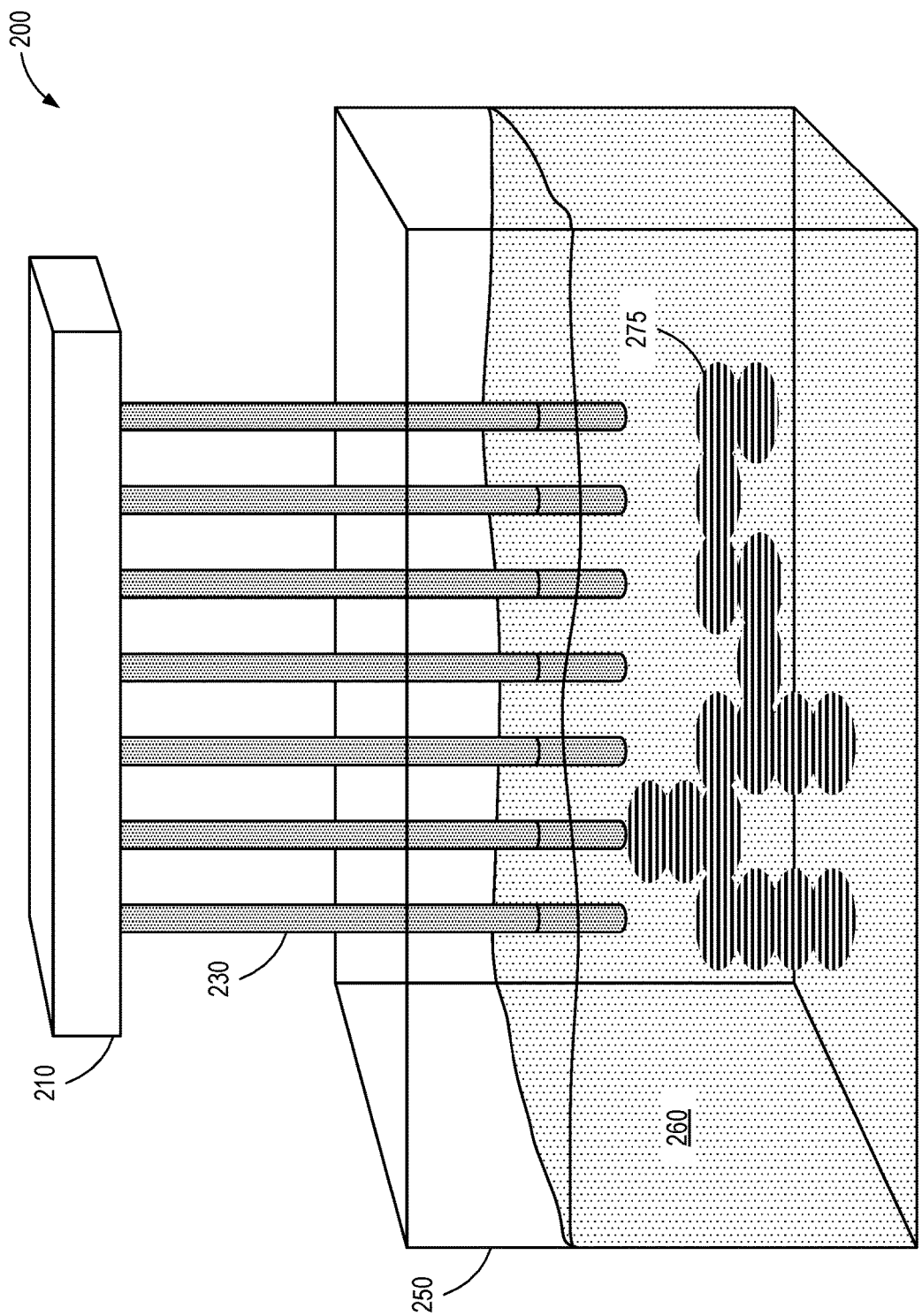
FIG. 2A illustrates a two-dimensional array of injector printheads for injecting a resin hardener into a container of resin, according to one embodiment.

FIG. 2A illustrates a three-dimensional printing system 200 that includes a controller and supply component 210 that feeds a one-dimensional array of injector printheads 230 for injecting a resin hardener 275 into a container 250 of resin 260, according to one embodiment. As the three-dimensional printing system 200 is slowly retracted out of the container 250 of resin 260, the controller 210 causes the injector printheads 230 to selectively deposit hardener 275. As illustrated, the hardener 275 is deposited as a plurality of voxels in a target pattern. The illustrated embodiment shows a one-dimensional array of seven injector printheads 230. It is appreciated that a larger one-dimensional array and/or a two-dimensional array of injector printheads 230 is possible as well.

Figure 2B:
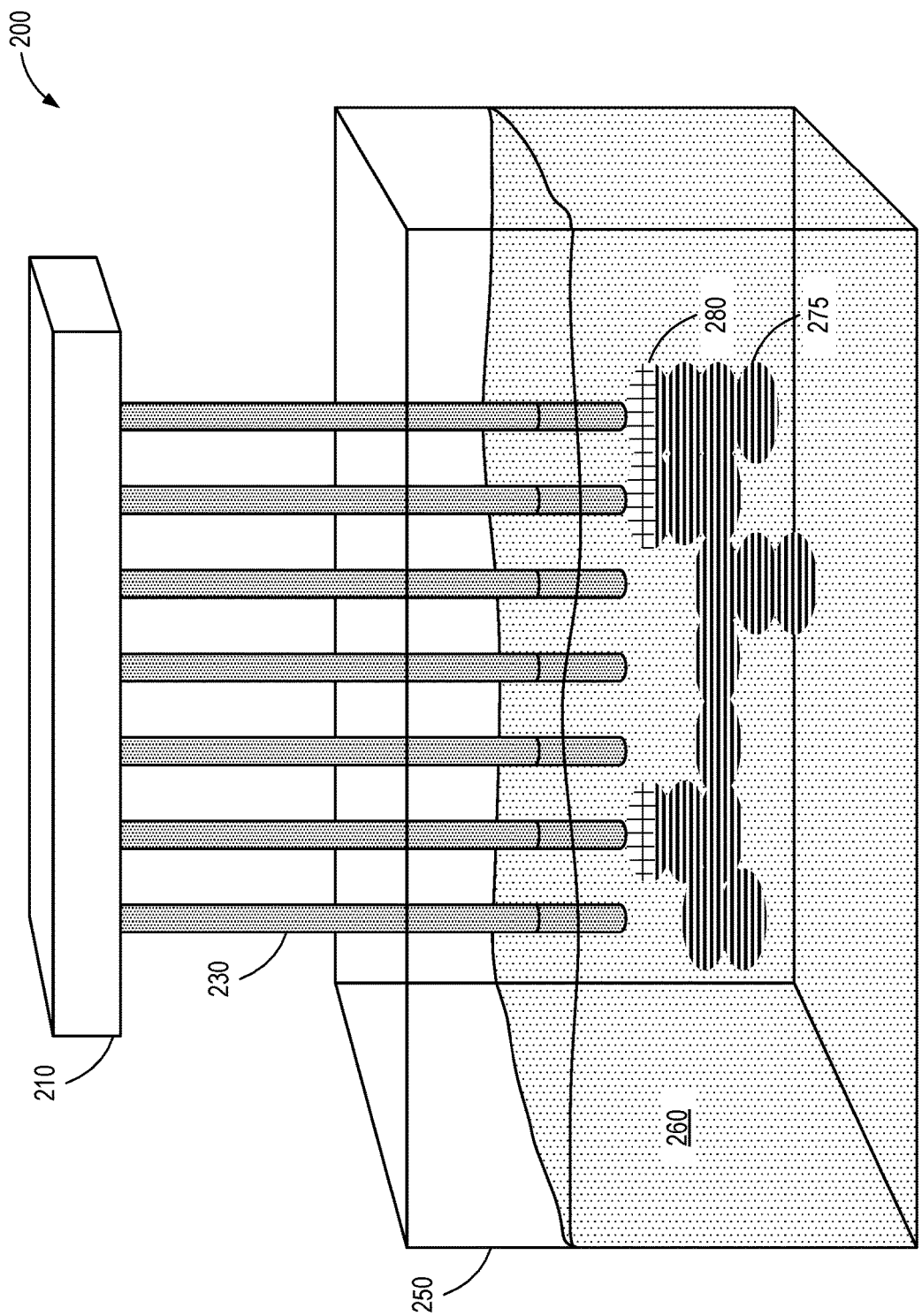
FIG. 2B illustrates a two-dimensional array of injector printheads being retracted from a container of resin as they deposit resin hardener, according to one embodiment.

FIG. 2B illustrates the three-dimensional printing system 200 of FIG. 2A, wherein the one-dimensional array of injector printheads 230 is being retracted from a container 250 of resin 260 as resin hardener 280 is deposited on top of un-locked (i.e., un-hardened) resin hardener 275. Resin hardener 275 and 280 may be injected according to a target pattern. The resin hardener deposition phase may be completed within a few seconds as the injector printheads 230 are retracted from the container 250 of resin 260. The deposited resin hardener may lock over a much longer time period as the resin hardens. However, while the first three-dimensional object of hardening resin (275 and 280) locks, the printing system 200 can be used to deposit hardener in one or more additional containers of resin—all of which may finish the locking phase in parallel.

Figure 3A:
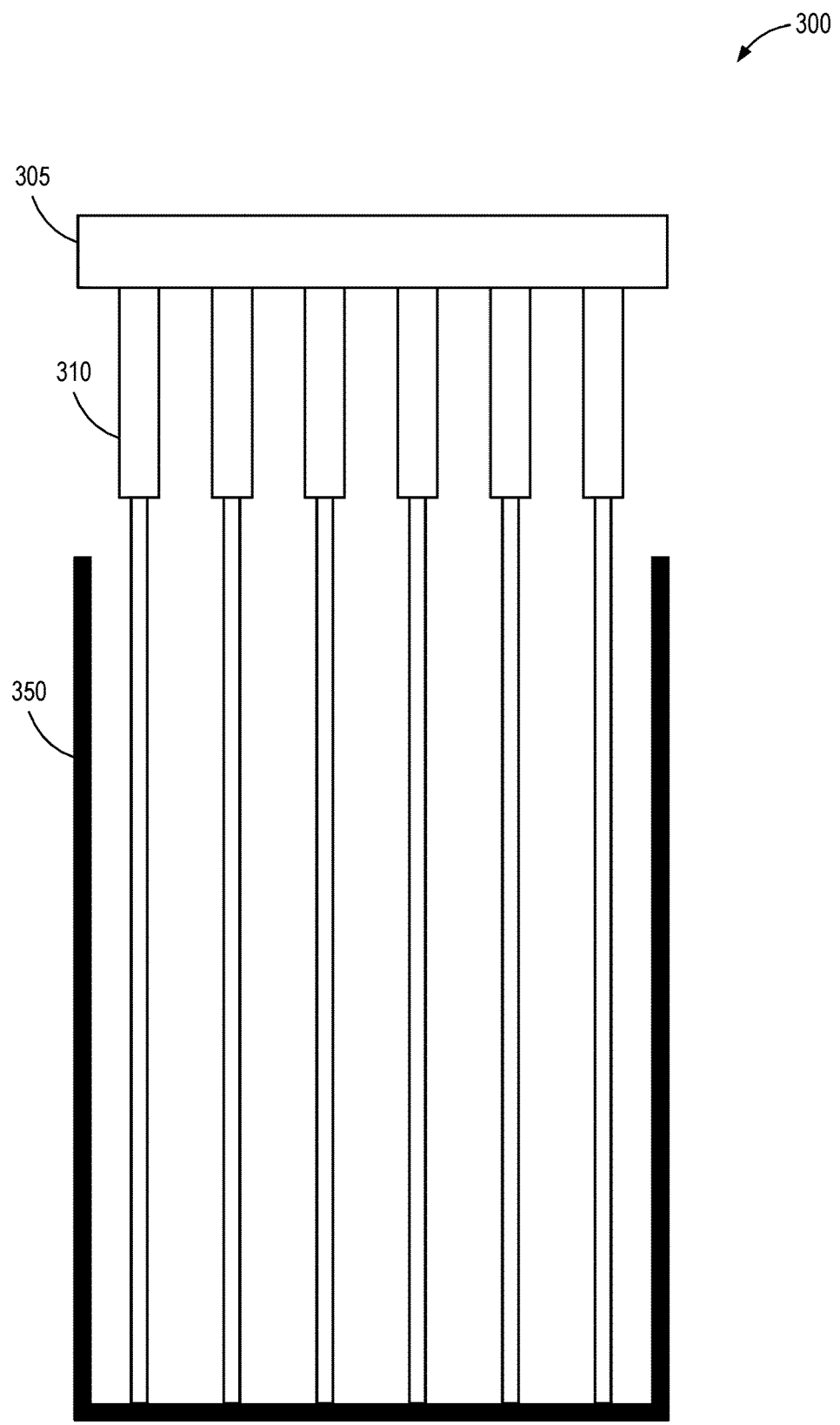
FIG. 3A illustrates a two-dimensional cross section showing an array of needle injector printheads inserted within a container, according to one embodiment.

FIG. 3A illustrates a three-dimensional printer or printing system 300 with a feed 305 for feeding print material into a plurality of injector printheads 310. The injector printheads 310 are inserted within an empty container 350. The injector printheads 310 may be very close together and may be part of a two-dimensional array of injectors inserted within a three-dimensional container.

Figure 3B:
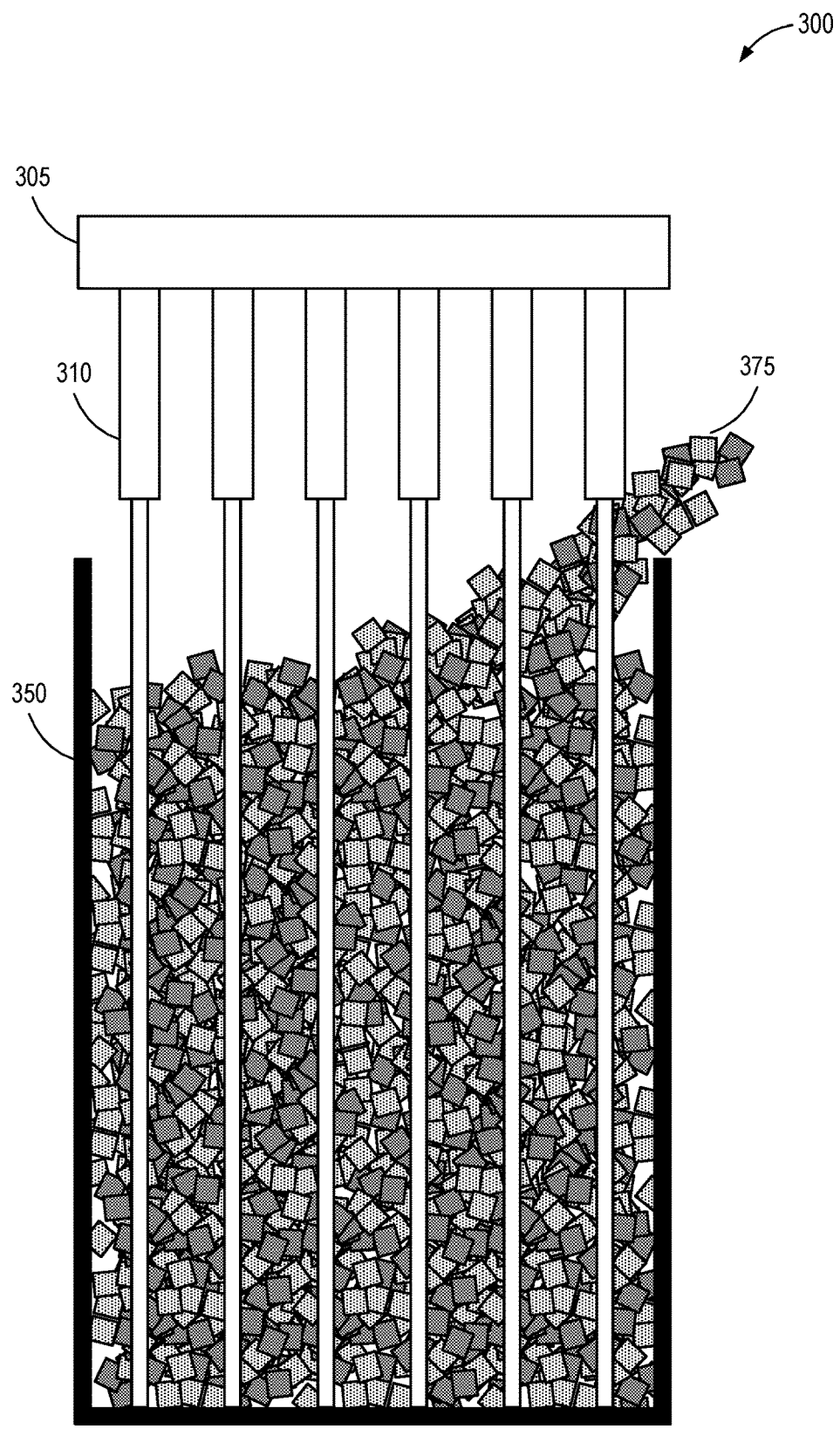
FIG. 3B illustrates the two-dimensional cross section of the container in FIG. 3A with fill material inserted within the container around the needle injector printheads.

FIG. 3B illustrates the cross section of the container 350 with fill material 375 being inserted within the container 350 around the needle-like injector printheads 310. In various embodiments, the injector printheads 310 may be inserted into the container 350 after the fill material 375 has been inserted. In other embodiments, the fill material 375 may not easily accommodate the insertion of the injector printheads 310 and/or the injector printheads 310 may be too fragile to be inserted into the fill material 375.

Figure 3C:
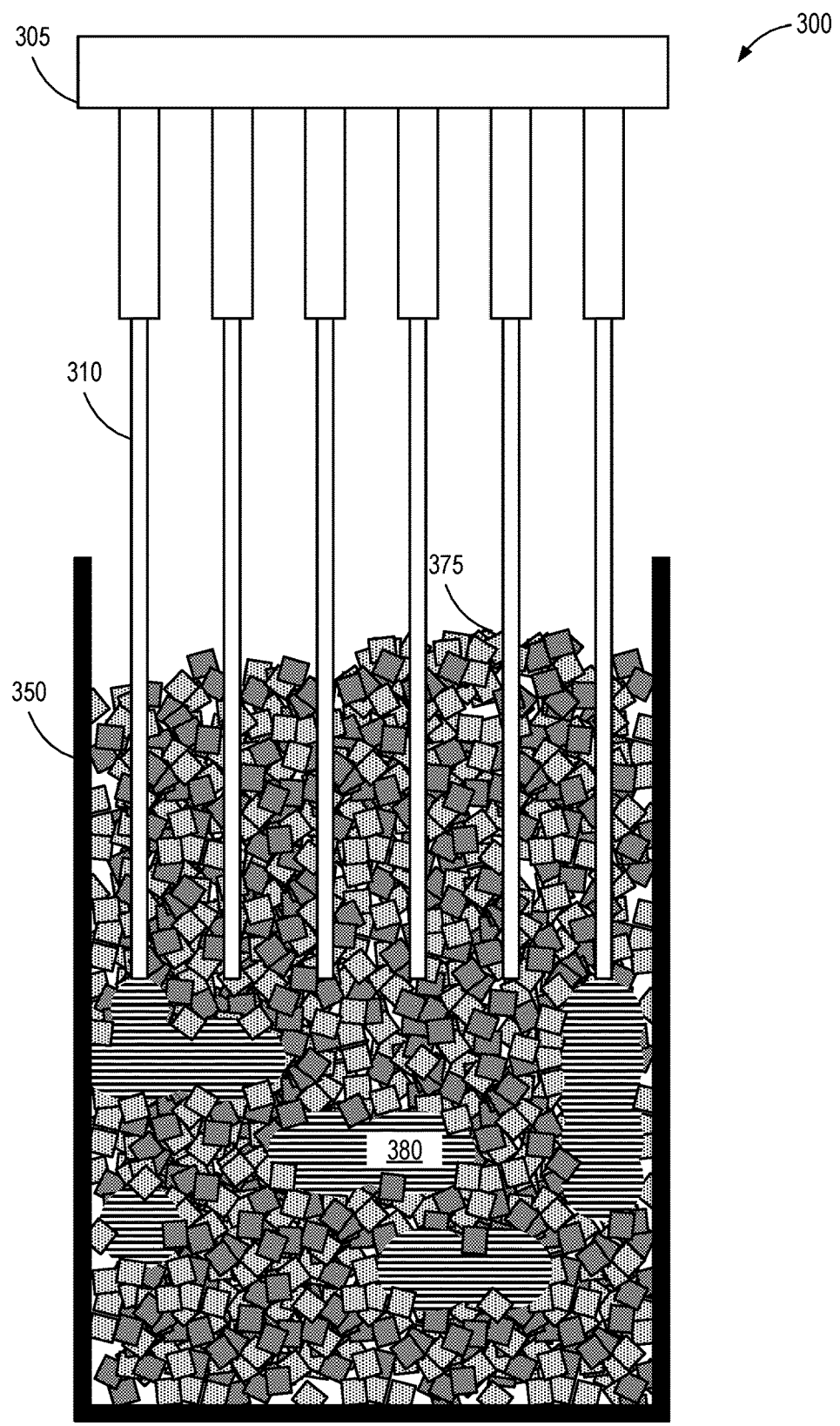
FIG. 3C illustrates the two-dimensional cross section of the container in FIG. 3A with the needle injector printheads partially retracted having selectively injected a bonding agent, according to one embodiment.

FIG. 3C illustrates the cross section of the container 350 with the needle injector printheads 310 partially retracted having selectively injected a bonding agent 380 into the fill material 375 at selective locations. The bonding agent 380 may be selectively injected to bond the fill material 375 in selective locations to form a bonded, three-dimensional object. The three-dimensional printer 300 may be used to print successive three-dimensional objects while the fill material 375 injected with the boding agent 380 goes through the locking phase. Once the fill material 375 and bonding agent 380 are locked, the un-bonded fill material 375 may be removed to reveal the fully locked, three-dimensionally printed object.

Figure 4A:
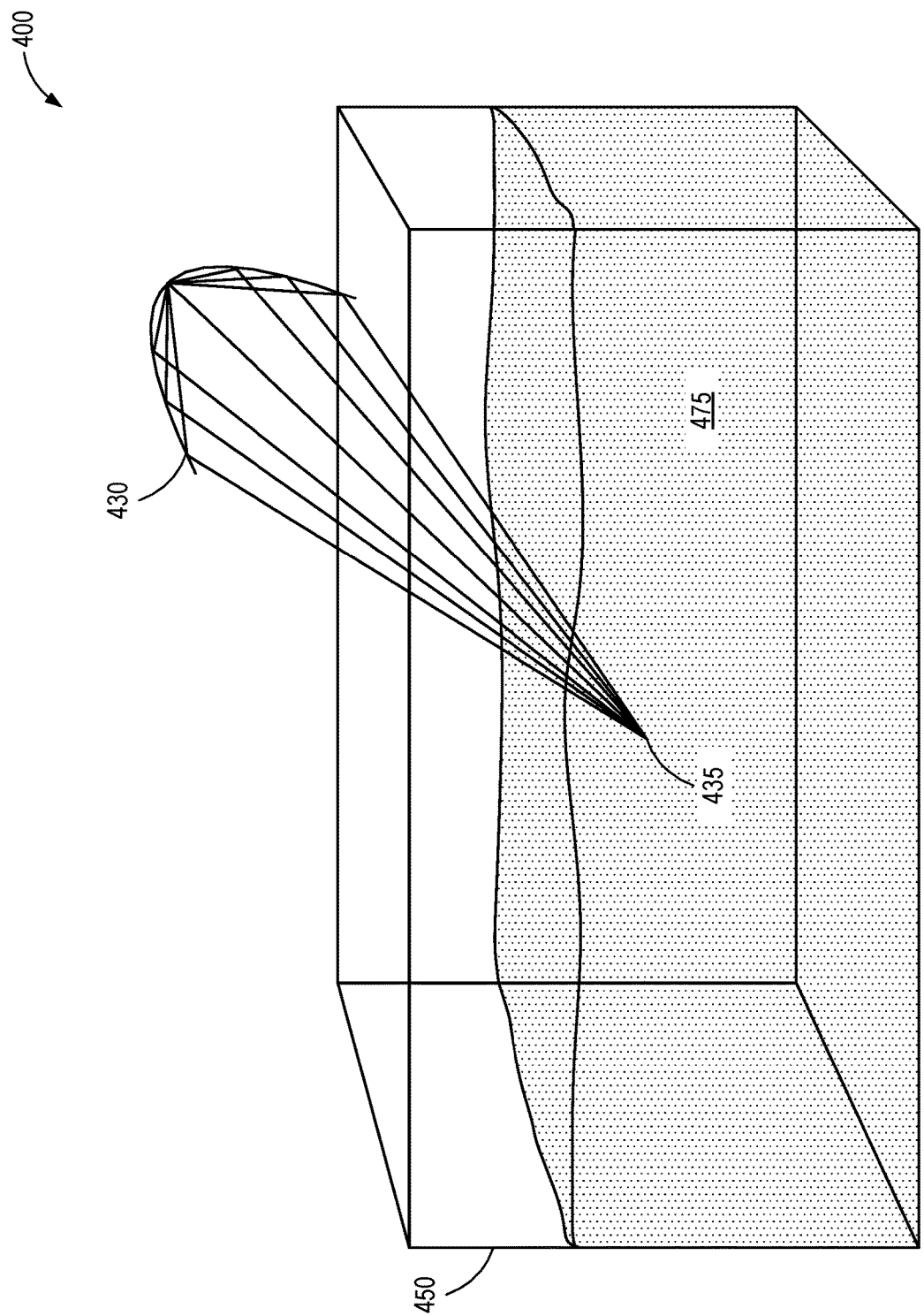
FIG. 4A illustrates a focused beam for hardening a voxel within a container of a fill material, according to one embodiment.

FIG. 4A illustrates a three-dimensional printing system 400 that includes a beamforming device 430 for beamforming ultrasound or electromagnetic radiation to a focus 435 within a fill material 475 contained within a container 450. The ultrasound or electromagnetic radiation (depending on the embodiment) is focused to cause the fill material 475 to lock at the focus location 435. By moving the focus 435 to various locations, a plurality of locked voxels may be formed within the fill material 475 corresponding to a three-dimensional object.

Figure 4B:
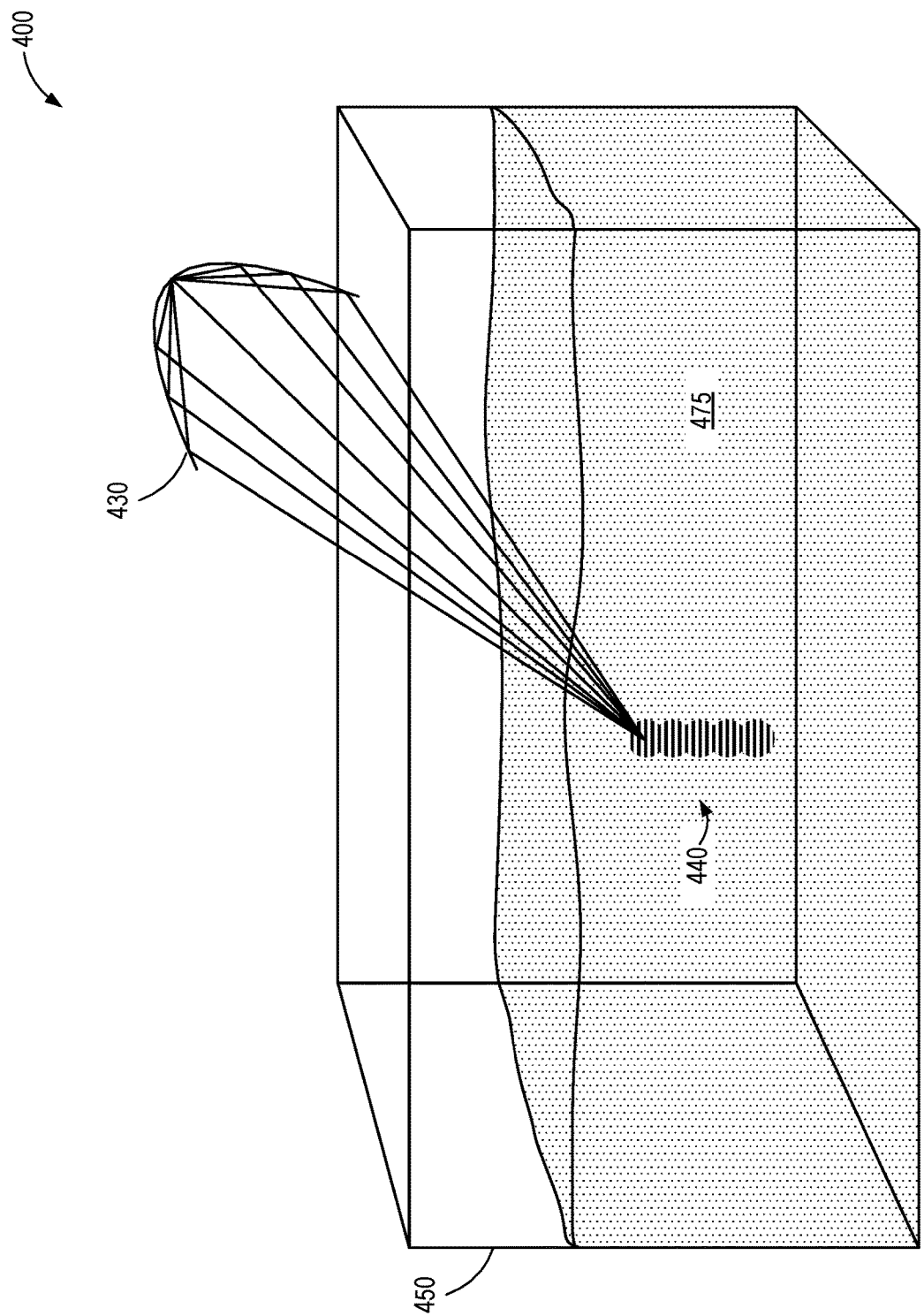
FIG. 4B illustrates the focused beam of FIG. 4A having hardened five voxels within the fill material, according to one embodiment.

FIG. 4B illustrates the focused beam of the beamforming device 430 of FIG. 4A having hardened five voxels 440 within the fill material 475, according to one embodiment. The three-dimensionally printed voxels 440 may be selectively locked at locations to form a two- or three-dimensional object. In some embodiments, the focus of the beamforming device 430 may take several seconds or minutes to lock, but the beamforming device 430 may initiate the hardening (or other locking process) at various voxel locations in succession for parallel locking.

Figure 4C:
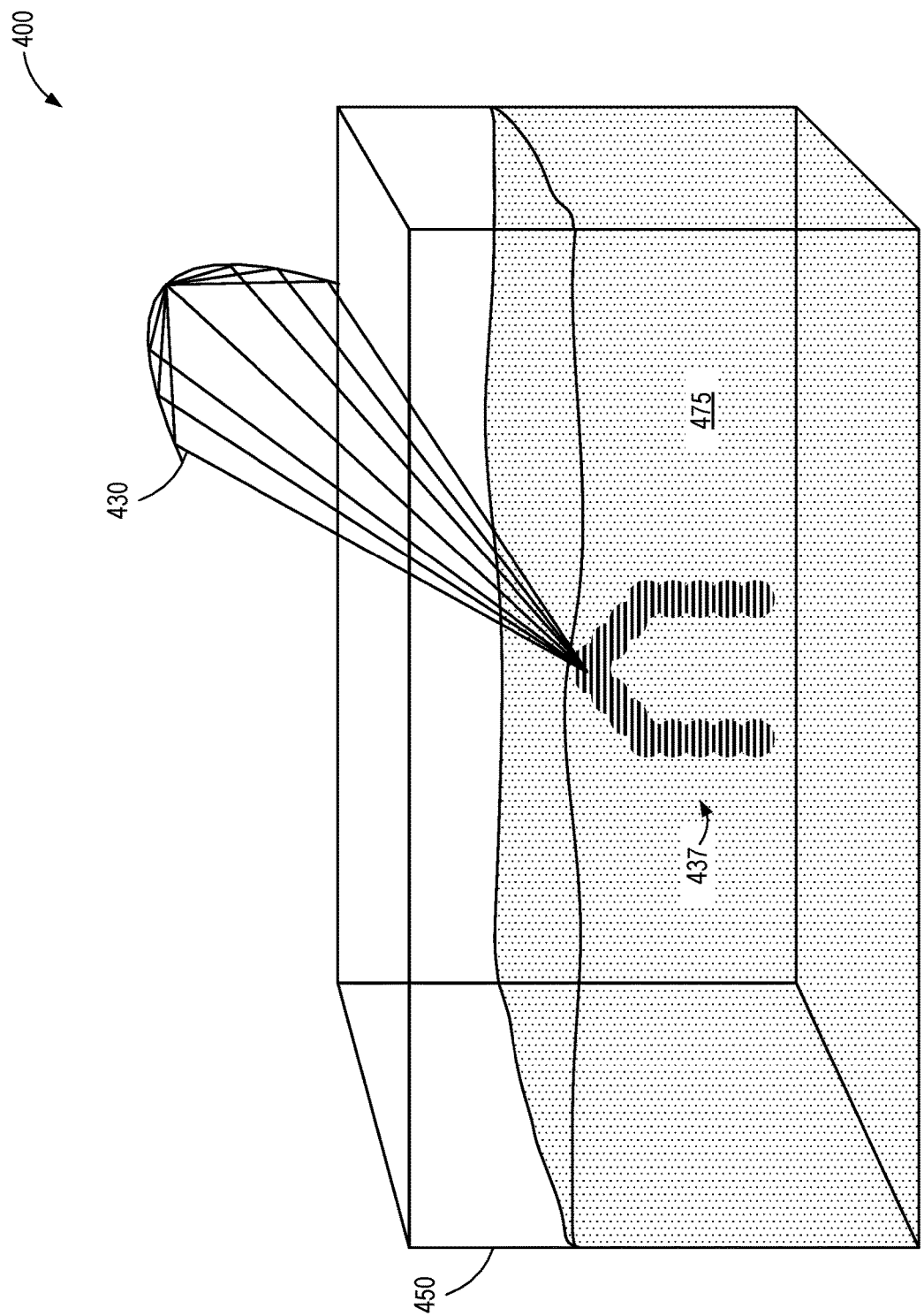
FIG. 4C illustrates the focused beam of FIG. 4A having hardened a sequence of voxels to form a three-dimensional pattern.

FIG. 4C illustrates the focused beam of the beamforming device 430 of FIG. 4A having hardened a sequence 437 of voxels to form a three-dimensional object. The three-dimensional object may take several minutes or hours to fully lock, at which point it can be removed from the fill material 475. While the three-dimensional object is locking, the beamforming device 430 may be used to print three-dimensional objects in a plurality of other containers filled with a fill material. Each of the printed objects may lock in parallel.

Figure 5:
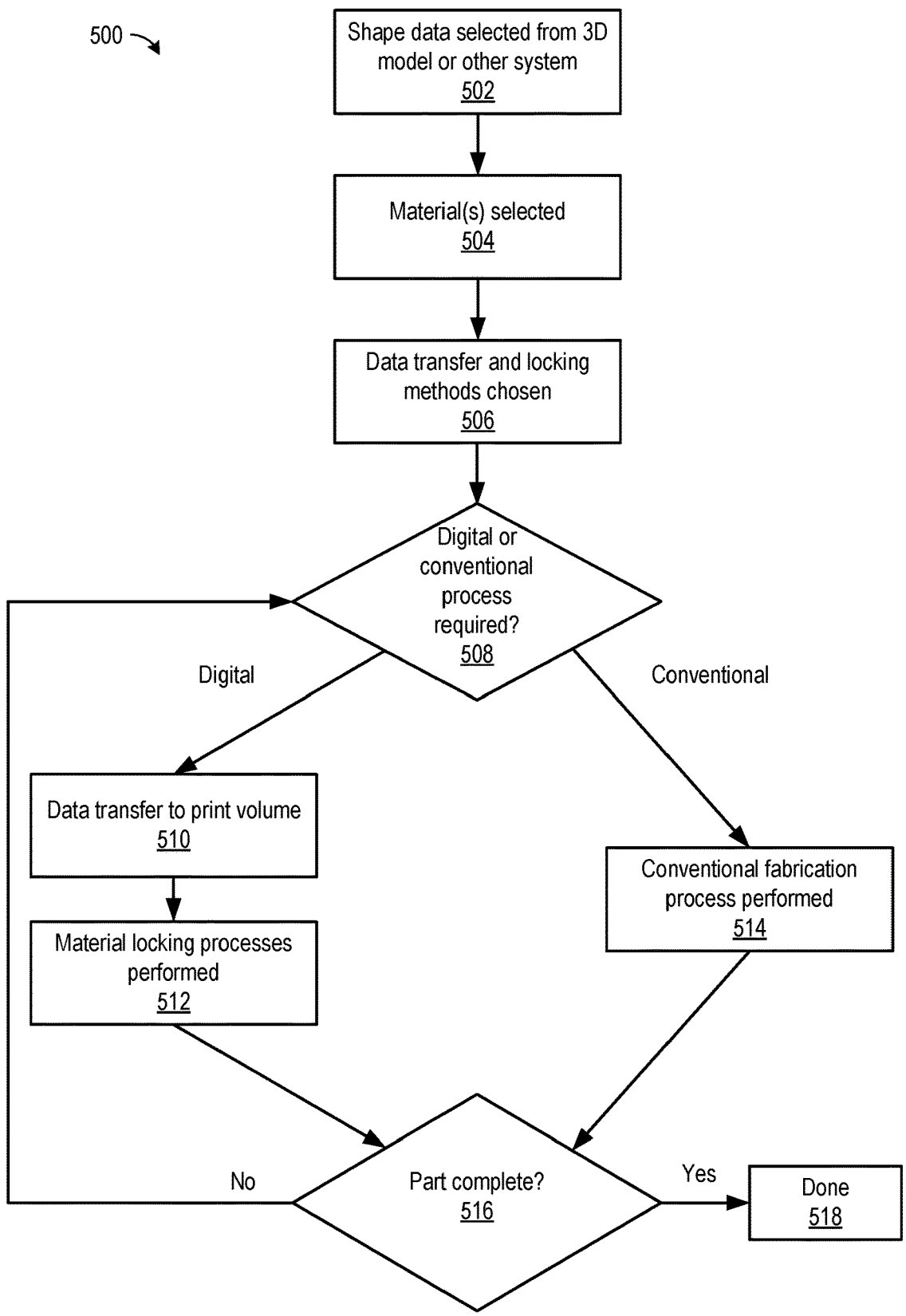
FIG. 5 illustrates a simplified flow chart of a method of printing, according to one embodiment.

FIG. 5 illustrates a simplified flow chart 500 of a method of printing, according to one embodiment. As illustrated, shape data may be selected or generated corresponding to a three-dimensional model or system, at 502. One or more materials and/or colors may be selected for printing, at 504. A data transfer and locking method is chosen, at 506. For example, a resin-based three-dimensional printer with injector needles may be used to inject a hardener into resin. As another example, a bonding agent may be injected into a fill material, as described above.

In some embodiments, a conventional process may be utilized, at 508, and conventional fabrication, at 514, may be performed. The three-dimensional object may be completed, including both a deposition (data transfer) phase and a locking phase, at 516, and the process may end, at 518. Alternatively, the digital process described herein may be utilized, at 508, in which voxels of print material are produced surrounded by support material, at 510. All of the print material voxels are created, at 510, and then the locking process of the various voxels of print material is performed in parallel, at 512.

Figure 6:
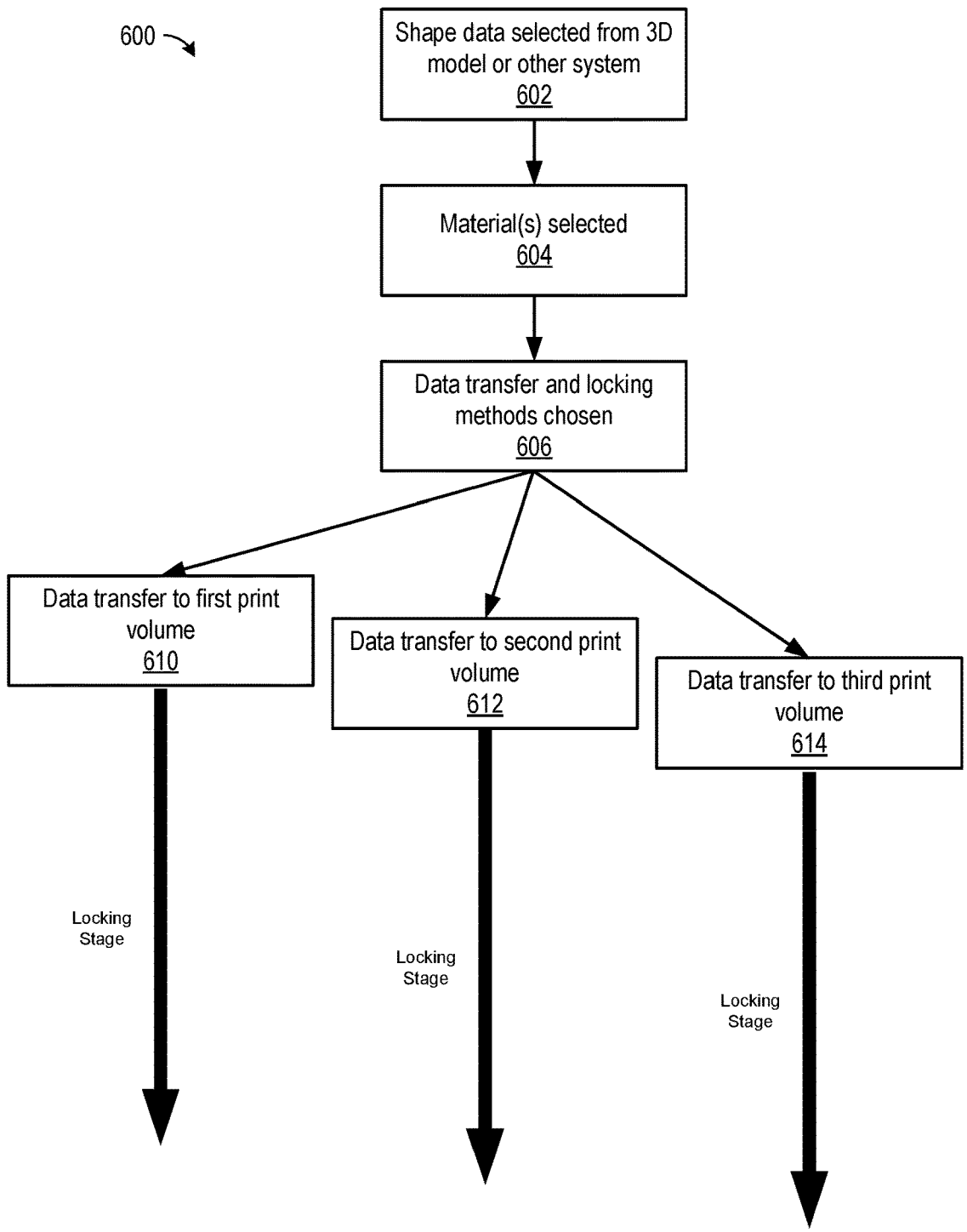
FIG. 6 illustrates a simplified flow chart of a method of printing three objects with parallel locking, according to one embodiment.

FIG. 6 illustrates a flow chart 600 of a specific example of a method of printing three objects with parallel locking, according to one embodiment. As illustrated, shape data is selected or generated from a model or other system, at 602. One or more materials and/or colors are selected, at 604. A data transfer and/or locking method is chosen, at 606. The locking method may be selected based on the inherent locking parameters of the selected material(s). A three-dimensional printer transfers the data representing a three-dimensional object into a plurality of voxels of print material in a first volume, at 610. As represented by the bold arrow below the box 610, the first printed material may begin a locking phase that takes several minutes, hours, or even days.

Before the locking phase of the first printed object, 610, is complete (represented by the end of the bold arrow), the three-dimensional printer may be used to perform a data transfer of voxels representing a three-dimensional object to a second physical print volume, at 612. While the first and second print volumes 610 and 612 are locking, a third print volume is completed, at 614. Additional print volumes may subsequently be completed. Ultimately, the print material from the data transfer stage of the first three print volumes 610, 612, and 614 may be completed before the first print volume, at 610, has even finished locking. Accordingly, the three print volumes 610, 612, and 614 may go through the locking phase in parallel.

Figure 7:
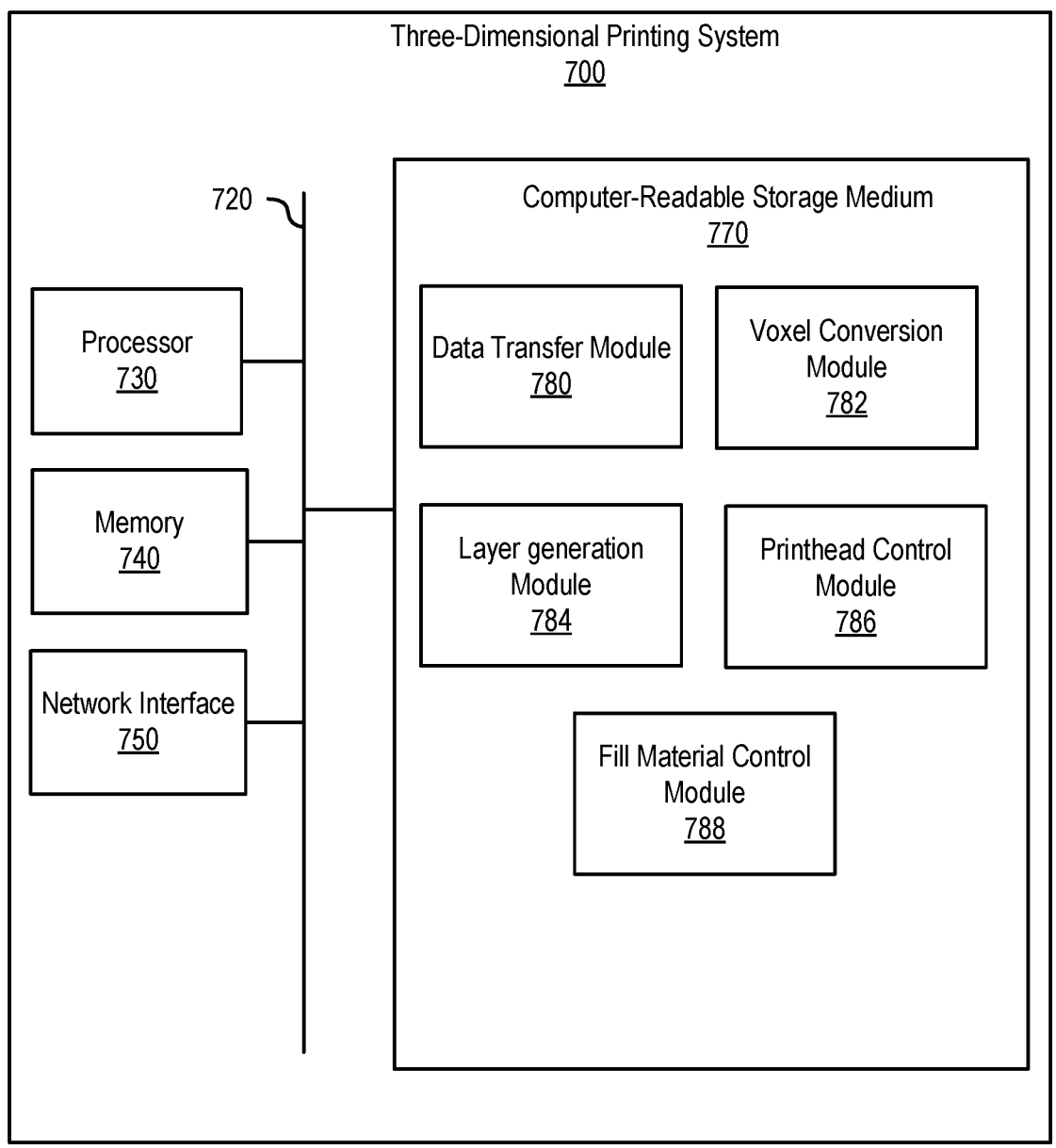
FIG. 7 illustrates an example of a computer system with various modules for controlling three-dimensional printing, according to one embodiment.

FIG. 7 illustrates an example of a three-dimensional printing system 700 with various modules for controlling the three-dimensional printing, according to one embodiment. The system 700 may include a bus 720 that connects a processor 730, memory 740, network interface 750, and a computer-readable storage medium 770. The computer-readable storage medium 770 may include one or more modules implemented in hardware, firmware, or software to effectuate the three-dimensional printing with separated data transfer stages and locking stages.

Specifically, a data transfer module 780 may control the transfer of data representing a three-dimensional object into a physical media as a plurality of voxels. A voxel conversion module 782 may convert data representing a smooth-form three-dimensional object into a plurality of voxels having a finite resolution for three-dimensional printing. In some embodiments, a layer generation module 784 may organize the voxels to be printed as a series of layers. A printhead control module 786 may cause the printheads for depositing a material to be retracted from a deposition surface or container on or within which the three-dimensional object is printed as a plurality of voxels. In some embodiments, a fill material control module 788 may control the deposition of a fill material within some voxels to provide support and/or a bondable material for supporting or directly becoming the three-dimensional object being printed.

This disclosure has been made with reference to various embodiments, including the best mode. However, those skilled in the art will recognize that changes and modifications may be made to the embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be understood to encompass at least the subsequent claims.

What is claimed is:

1. A three-dimensional printing system, comprising:
a container to selectively receive concrete and fill material;
a fill material deposition tube within each of a plurality of cells of a printhead to selectively deposit fill material within the container;
a concrete extrusion tube within each cell of the printhead to selectively extrude concrete within the container;
a supply divided into supply cells corresponding to the cells of the printhead, wherein each supply cell is adapted to receive both fill material and concrete,
wherein each supply cell comprises a first tube cover to cover an opening in the fill material deposition tube when concrete is supplied to the supply cell, and
wherein each supply cell comprises a second tube cover to cover an opening in the concrete deposition tube when fill material is supplied to the supply cell;
a retraction assembly to retract the printhead, including the fill material deposition tube and the concrete extrusion tube within each cell of the printhead, from a first depth to a final depth within the container; and
a controller to:
selectively deposit fill material in each of a plurality of voxels at various layers within the container between the first depth and the final depth, and
selectively extrude concrete into each of the plurality of voxels at various layers within the container between the first depth and the final depth.

2. The three-dimensional printing system of claim 1, wherein the fill material comprises one of beads, gravel, and sand.

3. The three-dimensional printing system of claim 1, wherein the fill material is deposited in the plurality of voxels corresponding to an outline of a target three-dimensional object.

4. The three-dimensional printing system of claim 1, wherein each of the fill material deposition tubes has an electronically actuated valve to control the deposition of the fill material within the cells of the printhead.

5. The three-dimensional printing system of claim 1, wherein each of the concrete extrusion tubes has an electronically actuated valve to control the extrusion of the concrete.

6. The three-dimensional printing system of claim 1, wherein the first tube cover and the second tube cover of each supply cell are combined as single unit that has two positions, a first position in which concrete is extruded and a second position in which fill material is deposited.

7. A three-dimensional printing system, comprising:
- a container to selectively receive concrete and fill material;
- a fill material deposition tube within each of a plurality of cells of a printhead to selectively deposit fill material within the container;
- a first electronically actuated valve to control the deposition of the fill material within the cells of the printhead;
- a concrete extrusion tube within each cell of the printhead to selectively extrude concrete within the container;
- a second electronically actuated valve to control the extrusion of the concrete within the cells of the printhead
- a supply divided into supply cells corresponding to the cells of the printhead, wherein each supply cell is adapted to receive both fill material and concrete, wherein each supply cell comprises a first tube cover to cover an opening in the fill material deposition tube when concrete is supplied to the supply cell, and wherein each supply cell comprises a second tube cover to cover an opening in the concrete deposition tube when fill material is supplied to the supply cell;
- a retraction assembly to retract the printhead, including the fill material deposition tube and the concrete extrusion tube within each cell of the printhead, from a first depth to a final depth within the container; and
- a controller to:
  - selectively deposit fill material in each of a plurality of voxels at various layers within the container between the first depth and the final depth, and
  - selectively extrude concrete into each of the plurality of voxels at various layers within the container between the first depth and the final depth.

8. The three-dimensional printing system of claim 7, wherein the fill material comprises one of beads, gravel, and sand.

9. The three-dimensional printing system of claim 7, wherein the first tube cover and the second tube cover of each supply cell are combined as single unit that has two positions, a first position in which concrete is extruded and a second position in which fill material is deposited.

* * * * *